United States Patent
Smith et al.

(10) Patent No.: US 10,297,996 B1
(45) Date of Patent: May 21, 2019

(54) REVERSIBLE JUNCTION BOX COVER

(71) Applicant: Viza Electronics Pte. Ltd., Charlotte, NC (US)

(72) Inventors: Simon Christopher Smith, Benfleet (GB); Robert Zamora, Huntersville, NC (US); Jack Lula, Burlington (CA)

(73) Assignee: Viza Electronics Pte. Ltd., Charlotte, NC (US)

( * ) Notice: Subject to any disclaimer, the term of this patent is extended or adjusted under 35 U.S.C. 154(b) by 64 days.

(21) Appl. No.: 15/816,311

(22) Filed: Nov. 17, 2017

Related U.S. Application Data

(60) Provisional application No. 62/423,523, filed on Nov. 17, 2016.

(51) Int. Cl.
| | |
|---|---|
| *F21V 3/00* | (2015.01) |
| *H02G 3/08* | (2006.01) |
| *F21V 23/00* | (2015.01) |
| *F21V 23/02* | (2006.01) |
| *F21Y 105/00* | (2016.01) |
| *F21Y 115/10* | (2016.01) |

(52) U.S. Cl.
CPC .............. *H02G 3/083* (2013.01); *F21V 3/00* (2013.01); *F21V 23/001* (2013.01); *F21V 23/02* (2013.01); *F21Y 2105/00* (2013.01); *F21Y 2115/10* (2016.08)

(58) Field of Classification Search
CPC ........ H02G 3/083; F21V 23/001; F21V 23/02; F21V 3/00
See application file for complete search history.

(56) References Cited

U.S. PATENT DOCUMENTS

| | | | | |
|---|---|---|---|---|
| 8,933,331 B1 * | 1/2015 | Gretz | ..................... | H02G 3/121 174/50 |
| 8,933,350 B1 * | 1/2015 | Gretz | ..................... | H02G 3/121 174/666 |

* cited by examiner

*Primary Examiner* — Thomas M Sember
(74) *Attorney, Agent, or Firm* — Lee & Hayes, P.C.

(57) ABSTRACT

A junction box assembly may include a junction box base and a junction box cover. The junction box base may define a junction box internal recess. The junction box cover may include a mounting flange, a cover barrier spaced from the mounting flange, and a wall extending between the mounting flange and the cover barrier and defining a junction box cover recess. The junction box cover may be configured to be alternatively coupled to a backing panel to form a junction box, such that either (1) the cover barrier of the junction box cover is received in the junction box internal recess and defines a first junction box space, or (2) the cover barrier is spaced from the backing panel and on a side of the backing panel opposite the junction box base and defines a second junction box space larger than the first junction box space.

21 Claims, 6 Drawing Sheets

REVERSIBLE JUNCTION BOX COVER

CROSS-REFERENCE TO RELATED APPLICATION

This application claims benefit under 35 U.S.C. § 119(e) of the filing date of U.S. Provisional Application No. 62/423,523, filed Nov. 17, 2016, the entire disclosure of which is incorporated herein by reference.

BACKGROUND

Electrical devices are often mounted to barriers so that the device can be operated in a convenient location. For example, electrical appliances such as lights and fans are often mounted to the ceiling of a room so that the benefits of the appliance can be obtained without interfering with floor or wall space of the room. There are several different common ceiling structures, which may affect how the electrical devices are mounted to the ceiling. For example, in a suspended or drop ceiling, there may be several inches or more of space between the level of the suspended ceiling and the structure of the building supporting the suspended ceiling. This space may provide sufficient space for housing utility-related structures, such as electrical conduit and junction boxes for supplying electrical power to lighting and other electrical devices associated with the ceiling. However, when the ceiling is not a suspended ceiling, space for utility-related structures may be limited. Thus, it may be desirable to provide electrical devices with low-profile designs in order to minimize the effects of mounting the electrical devices to such ceilings. In addition, if an electrical device is suitable for installation in a suspended ceiling, it may not suitable for installation in a ceiling that is not a suspended ceiling.

BRIEF DESCRIPTION OF THE DRAWINGS

The detailed description is described with reference to the accompanying figures. The same reference numbers in different figures indicate similar or identical items.

DETAILED DESCRIPTION

Figure 1:
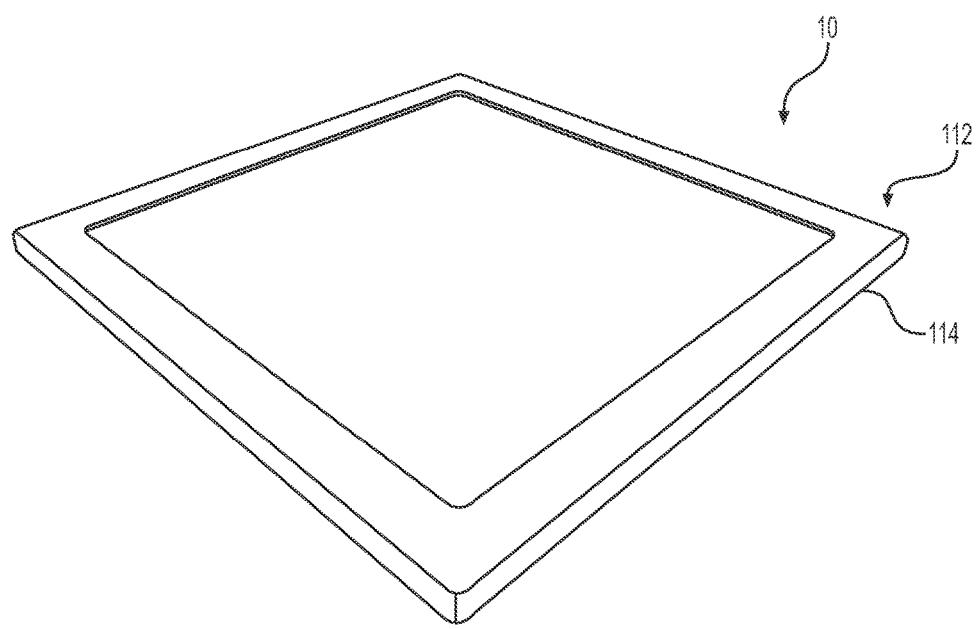
FIG. 1 is a schematic, perspective view of an example light emitting panel viewed from a first angle.

This disclosure is generally directed to junction box assemblies and light emitting panels. Light emitting panels may include any panels for emitting light that include one or more of light emitting diodes (LEDs), organic light emitting diodes (OLEDs), a light emitting substance on a substrate for generating light, or any other similar panels or light emitting devices. As discussed above, electrical devices are often mounted to barriers so that the device can be operated in a convenient location. For example, electrical appliances such as lights and fans are often mounted to the ceiling of a room so that the benefits of the appliance can be obtained without interfering with floor or wall space of the room. There are several different common ceiling structures, which may affect how the electrical devices are mounted to the ceiling. For example, in a suspended or drop ceiling, there may be several inches or more of space between the level of the suspended ceiling and the structure of the building supporting the suspended ceiling. This space may provide sufficient space for housing utility-related structures, such as electrical conduit and junction boxes for supplying electrical power to lighting and other electrical devices associated with the ceiling. However, when the ceiling is not a suspended ceiling, space for utility-related structures may be limited. Thus, it may be desirable to provide electrical devices with low-profile designs in order to minimize the effects of flush-mounting the electrical devices to such ceilings. In addition, if an electrical device is suitable for installation in a suspended ceiling, it may not be suitable for installation in a ceiling that is not a suspended ceiling.

The junction box assemblies and light emitting panels disclosed herein may facilitate installation in both a suspended or drop ceiling and in a ceiling that is not a suspended or drop ceiling. For example, in some examples, the junction box assemblies and light emitting panels may be flush-mounted to a ceiling. Some examples of the junction box assemblies provide a channel for safely routing electrical conductors to supply power to the light emitting panels for operation.

In some examples, a junction box assembly for a light emitting panel may include a junction box base configured to be associated with a first panel face of a backing panel, such that a junction aperture in the backing panel is substantially closed by the junction box base. The junction box base may include a peripheral flange configured to be associated with the first panel face of the backing panel and surrounding the junction aperture at the first panel face. The junction box base may also include a side wall extending transverse to the peripheral flange, and a base wall associated with the side wall and configured to be spaced from and extend across the junction box aperture, thereby defining a junction box internal recess between the base wall and the junction box aperture. In some examples, the junction box assembly may also include a junction box cover configured to be coupled to a second panel face of the backing panel opposite the first panel face. The junction box cover may include a mounting flange defining a cover aperture, a cover barrier spaced from the mounting flange, and a wall extending between the mounting flange and the cover barrier and coupling the mounting flange to the cover barrier, thereby defining a junction box cover recess. In some examples, the junction box cover may be configured to be alternatively coupled to the backing panel to form a junction box, such that either (1) the cover barrier of the junction box cover is received in the junction box internal recess and defines a first junction box space, or (2) the cover barrier is spaced from the second panel face and on a side of the backing panel opposite the junction box base and defines a second junction box space. In some examples, the second junction box space may be larger than the first junction box space.

In some examples, the configuration of the junction box assembly may facilitate mounting of a light emitting panel including the junction box assembly in either a suspended ceiling having space between the level of the suspended ceiling and the supporting structure, or in, for example, a flush-mounted manner against a barrier, such as a ceiling formed from drywall or similar materials, or under cabinets. For example, in some examples, the junction box cover may provide a low-profile configuration when the cover barrier of the junction box cover is received in the junction box internal recess, for example, in a nesting manner. This may facilitate flush-mounting of the light emitting panel to a barrier, such as a conventional (non-suspended) ceiling. In some examples, the cover barrier of the junction box cover may be coupled to the junction box assembly such that the cover barrier is spaced from the second panel face of the backing panel and on a side of the backing panel opposite the junction box base. This reversed coupling of the junction box cover provides a larger space inside the junction box, which may be beneficial. Such a configuration may be used when the light emitting panel is mounted or installed in a suspended or drop ceiling, and there is sufficient space for a larger junction box configuration provided by the reversed coupling of the junction box cover to the junction box assembly.

In some examples, a first plane defined by the mounting flange and a second plane defined by the cover barrier are substantially parallel, for example, within manufacturing tolerances. In some examples, the wall of the junction box cover may be sized and shaped to fit inside the peripheral flange of the junction box base, for example, in a nesting manner. In some examples, the wall of the junction box cover may be shorter than the side wall of the junction box base.

In some examples, the barrier of the junction box cover may include a hole configured to receive electrical conductors. In some examples, the junction box assembly may include a tubular fitting received in the hole of the barrier and extending away from the junction box cover recess. In some examples, the fitting may serve as a conduit for electrical conductors for supplying electrical power to the light emitting panel. In some examples, the mounting flange may define mounting holes for coupling the mounting flange to the backing panel. For example, the mounting holes may be configured to receive fasteners for fastening the mounting flange to the backing panel.

In some examples, the mounting flange may define a first plane, and the cover barrier may define a second plane spaced from the first plane. In some examples, the wall of the junction box cover may be substantially perpendicular with respect to at least one of the first or second planes, for example, within manufacturing tolerances.

In some examples, the barrier of the junction box cover may define at least one hole at least partially closed by a frangible bridge configured to break away from the barrier. For example, the barrier may include two holes, each at least partially closed by a frangible bridge configured to break away from the barrier. The frangible bridges may be removed from the barrier to create holes for receipt of electrical conductors and/or other electrical components, such as conduit, etc.

In some examples, the peripheral flange of the junction box base may define a third plane. In some examples, the base wall of the junction box base may define a fourth plane, and the fourth plane may be substantially parallel to the third plane, for example, within manufacturing tolerances. In some examples, the first, second, third, and fourth planes may be substantially parallel to one another, for example, within manufacturing tolerances.

In some examples, a junction box assembly for a light emitting panel may include a backing panel configured to be associated with a plurality of light emitting diodes. The backing panel may define a junction aperture, a first panel face, and a second panel face opposite the first panel face. The junction box assembly may also include a junction box base associated with the first panel face of the backing panel, such that the junction aperture in the backing panel is substantially closed by the junction box base. In some examples, the junction box base may include a peripheral flange associated with the first panel face of the backing panel and surrounding the junction aperture at the first panel face. The junction box base may also include a side wall extending transverse to the first face of the backing panel, and a base wall associated with the side wall and configured to be spaced from and extend across the junction aperture, thereby defining a junction box internal recess between the base wall and the junction aperture. In some examples, the junction box assembly may also include a junction box cover configured to be coupled to the second panel face of the backing panel opposite the first panel face. The junction box cover may include a mounting flange defining a cover aperture. The junction box cover my also include a cover barrier spaced from the mounting flange, and a wall extending between the mounting flange and the cover barrier and coupling the mounting flange to the cover barrier, thereby defining a junction box cover recess. In some examples, the junction box cover may be configured to be alternatively coupled to the backing panel such that either (1) the cover barrier of the junction box cover is received in the junction box internal recess and defines a first junction box space, or (2) the cover barrier is spaced from the second panel face and on a side of the backing panel opposite the junction box base and defines a second junction box space. In some examples, the second junction box space may be larger than the first junction box space.

In some examples, the junction aperture of the backing panel and the wall of the mounting flange may be sized and shaped such that the wall fits within the junction aperture, for example, in a nesting manner. In some examples, the second panel face of the backing panel may define a panel recess surrounding the junction aperture, wherein the mounting flange of the junction box cover is configured to fit in the recess.

In some examples, the backing panel may include embossments. For example, the embossments may include raised portions and recesses, and the raised portions may lie in a first embossment plane and the recesses may lie in a second embossment plane. In some examples, the first embossment plane and the second embossment lane may be substantially parallel to one another, for example, within manufacturing tolerances. In some examples, the mounting flange defines a first plane and the cover barrier defines a second plane spaced from the first plane, and when the cover barrier of the junction box cover is received in the junction box internal recess and defines the first junction box space, the second plane of the cover barrier may be between the first embossment plane and the second embossment plane. In some examples, when the cover barrier is spaced from the second panel face and on the side of the backing panel opposite the junction box base, and defines a second junction box space, the second plane of the cover barrier may be on a side of the first embossment plane opposite the second embossment plane.

In some examples, a light emitting panel may include a backing panel configured to be associated with a plurality of light emitting devices. The backing panel may define a junction aperture, a first panel face, and a second panel face opposite the first panel face. The light emitting panel may also include a plurality of light emitting diodes associated with the first panel face of the backing panel and facing across the backing panel. The light emitting panel may also include at least one illuminating sheet adjacent the plurality of light emitting diodes and extending at least partially across the backing panel. The light emitting panel may further include a junction box base associated with the first panel face of the backing panel, such that the junction aperture in the backing panel is substantially closed by the junction box base. In some examples, the junction box base may include a peripheral flange associated with the first panel face of the backing panel and surrounding the junction aperture at the first panel face. The junction box base may also include a side wall extending transverse to the first face of the backing panel, and a base wall associated with the side wall and configured to be spaced from and extend across the junction aperture, thereby defining a junction box internal recess between the base wall and the junction aperture. The light emitting panel may also include a junction box cover configured to be coupled to the second panel face of the backing panel opposite the first panel face. In some examples, the junction box cover may include a mounting flange defining a cover aperture, and a cover barrier spaced from the mounting flange. The junction box cover may also include a wall extending between the mounting flange and the cover barrier and coupling the mounting flange to the cover barrier, thereby defining a junction box cover recess. In some examples, the junction box cover may be configured to be alternatively coupled to the backing panel such that either (1) the cover barrier of the junction box cover is received in the junction box internal recess and defines a first junction box space, or (2) the cover barrier is spaced from the second panel face and on a side of the backing panel opposite the junction base and defines a second junction box space. The second junction box space may be larger than the first junction box space.

In some examples, the plurality of light emitting devices may include a strip of light emitting diodes. In some examples, the plurality of light emitting diodes may include a first plurality of light emitting diodes along a first edge of the backing panel and a second plurality of light emitting diodes along a second edge of the backing panel. In some examples, the first plurality of light emitting diodes and the second plurality of light emitting diodes face one another, and the illuminating panel is between the first and second plurality of light emitting diodes.

In some examples, the light emitting panel may also include an electronics module associated with the backing panel and configured to provide electrical power to a plurality of light emitting devices. In some examples, the electronics module may be associated with an edge of the backing panel, and the light emitting panel may further include an electrical conductor providing electrical power to the electronics module via the junction box assembly. In some examples, the light emitting panel may also include a cover associated with the backing panel and overlying the illuminating panel. In some examples, the cover may include at least one of a frame or a lens portion. In some examples, the lens portion may be transparent or translucent. In some examples, the light emitting panel may be a light emitting diode (LED) panel.

FIG. 1 is a schematic, perspective view of an example light emitting panel 10 that may be mounted on, or a part of, a barrier, such as, for example, a wall, a ceiling, or the underside of a cabinet. Other uses are contemplated. Although the example light emitting panel 10 shown in FIG. 1 is square, the light emitting panel 10 may have other shapes, such as, for example, rectangular, circular, polygonal, or any combination thereof.

Figure 2:
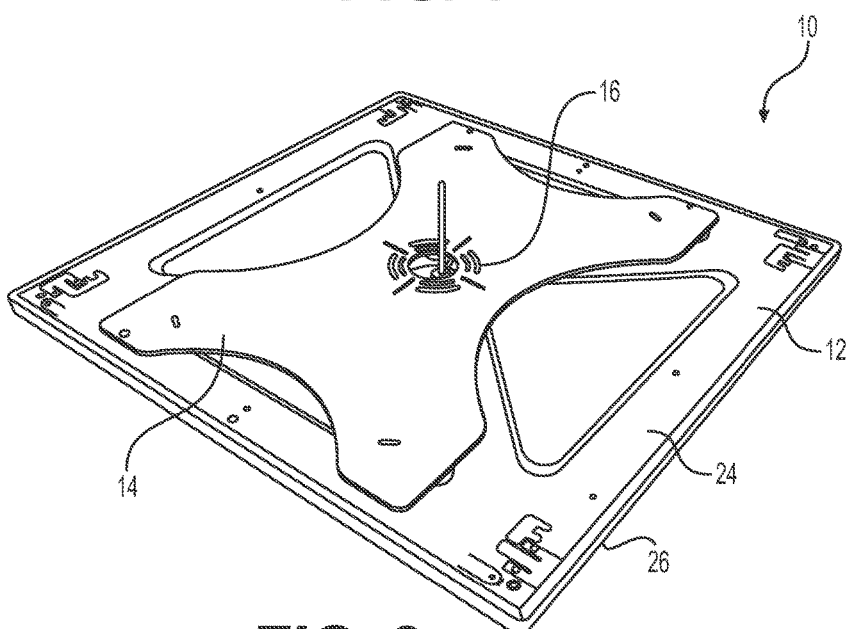
FIG. 2 is a schematic, perspective view of the example light emitting panel shown in FIG. 1 viewed from a second angle.

As shown in FIG. 2, the light emitting panel 10 may include a backing panel 12 to which various parts of the light emitting panel 10 may be coupled. In the example shown, the light emitting panel 10 also includes a mounting plate 14 configured to be mounted to, for example, a junction box (not shown) associated with the barrier to which the light emitting panel 10 is mounted. For example, the mounting plate 14 includes a plurality of curved slots 16 configured to receive fasteners (not shown) for coupling the mounting plate 14 to the junction box associated with the barrier. In some examples, after the mounting plate 14 is coupled to the junction box and the electrical connections are made, the remainder of the light emitting panel 10 may be coupled to the mounting plate 14. For example, the mounting plate 14 and the backing panel 12 may include couplers configured to cooperate with one another to permit the backing panel 12 to slide and/or be snapped into place on the mounting plate 14, thereby coupling the light emitting panel 10 to the barrier. Other methods of coupling the light emitting panel 10 to a barrier are contemplated. For example, the backing panel 12 may include tabs configured to receive fasteners for coupling the backing panel 12 and the light emitting panel 10 to a barrier.

FIGS. 3-7B show an example junction box assembly 18. In some examples, the junction box assembly 18 may provide an enclosed space for housing the coupling of electrical wires from the barrier for supplying electrical power to the light emitting panel 10 to electrical wires of the light emitting panel 10. In some examples, the junction box assembly 18 provides a channel for safely routing electrical wires to the light emitting panel 10. For example, the junction box assembly 18 may include a portion 20 of the backing panel 12 defining a junction aperture 22 (see FIGS. 7A and 7B), a first panel face 24, and a second panel face 26 opposite the first panel face 24. The junction box assembly 18 may also include a junction box base 28 (see FIGS. 5-7B) associated with the first panel face 24 of the backing panel 12, such that the junction aperture 22 in the backing panel 12 is substantially closed by the junction box base 28. The junction box base 28 may include a peripheral flange 30 associated with the first panel face 24 of the backing panel 12 and surrounding the junction aperture 22 at the first panel face 24. For example, the peripheral flange 30 may be coupled to, or formed as a part of, the first panel face 24. In some examples, the peripheral flange 30 may be coupled to the first panel face 24 via one or more of fasteners, such as rivets, screws, and/or bolts, welding, and/or adhesives.

In the example shown, the junction box base 28 also includes a side wall 32 extending transverse to (e.g., to perpendicular to) the first face 24 of the backing panel 12. The example side wall 32 is formed as an integral single piece with the peripheral flange 30. In some examples, the side wall 32 may be a separate piece coupled to the peripheral flange 30. The example junction box base 28 also includes a base wall 34 associated with the side wall 32. In some examples, the base wall 34 is configured to be spaced from and extend across the junction aperture 22, thereby defining a junction box internal recess 36 between the base wall 34 and the junction aperture 22. The example base wall 34 is formed as an integral single piece with the side wall 32. In some examples, the base wall 34 may be a separate piece coupled to the side wall 32.

Figure 3:
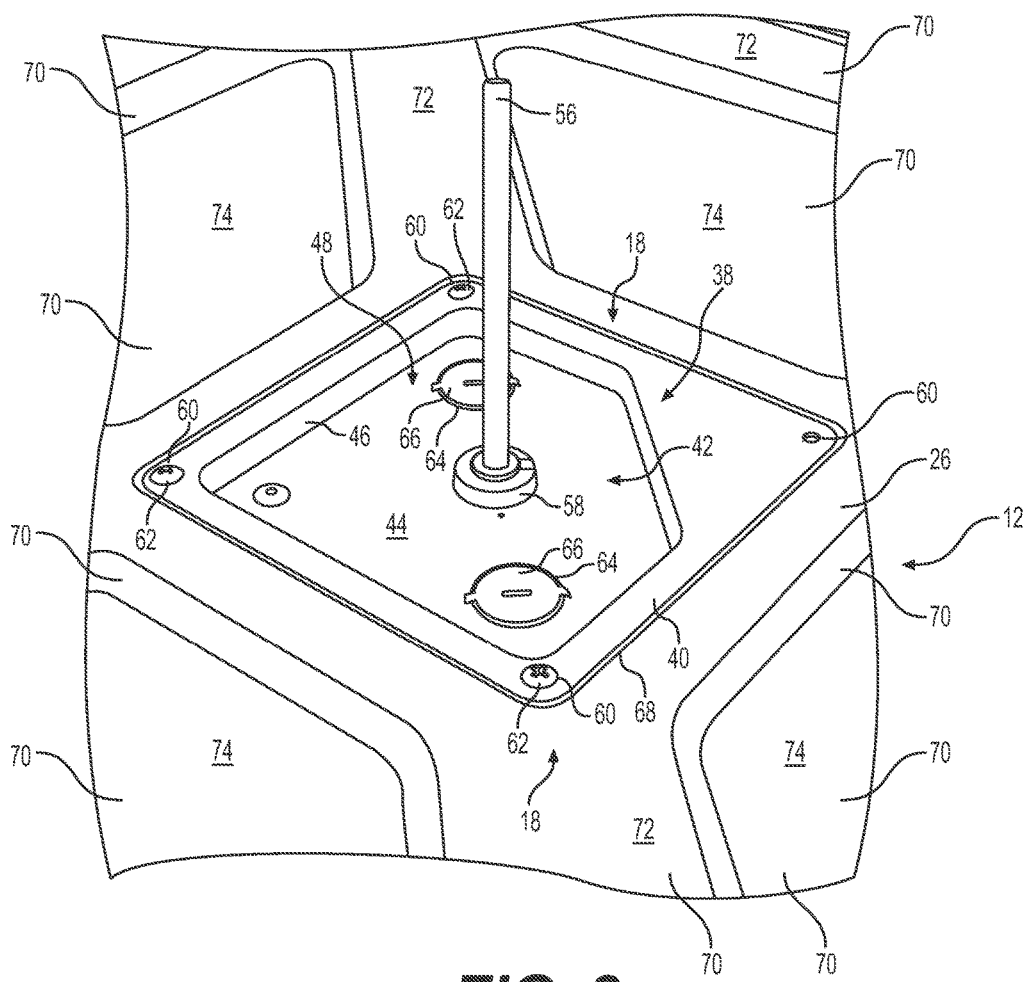
FIG. 3 is a schematic, perspective detail view of a portion of an example light emitting panel showing an example junction box cover in a first orientation.
Figure 4:
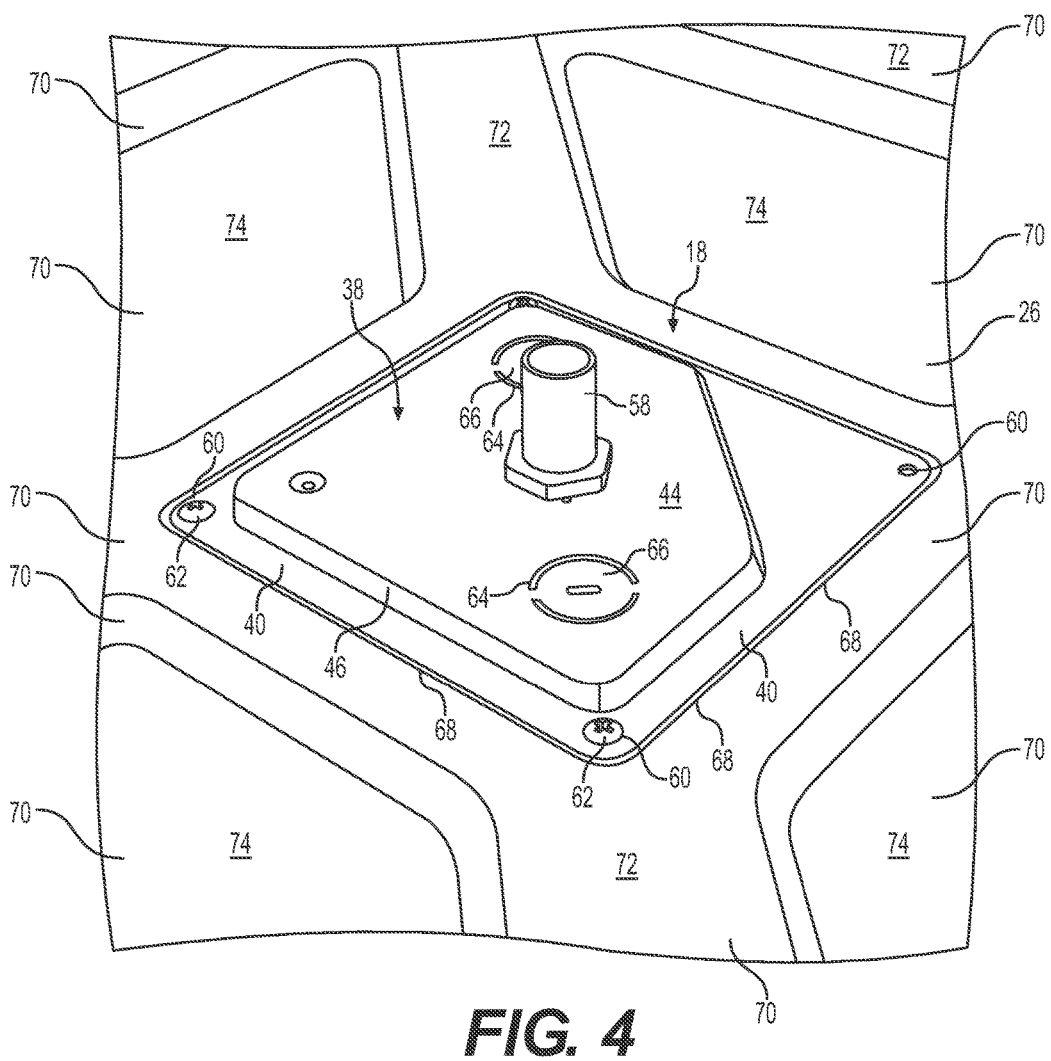
FIG. 4 is a schematic, perspective detail view of a portion of an example light emitting panel showing the example junction box cover shown in FIG. 3 in a second orientation.
Figure 7A:
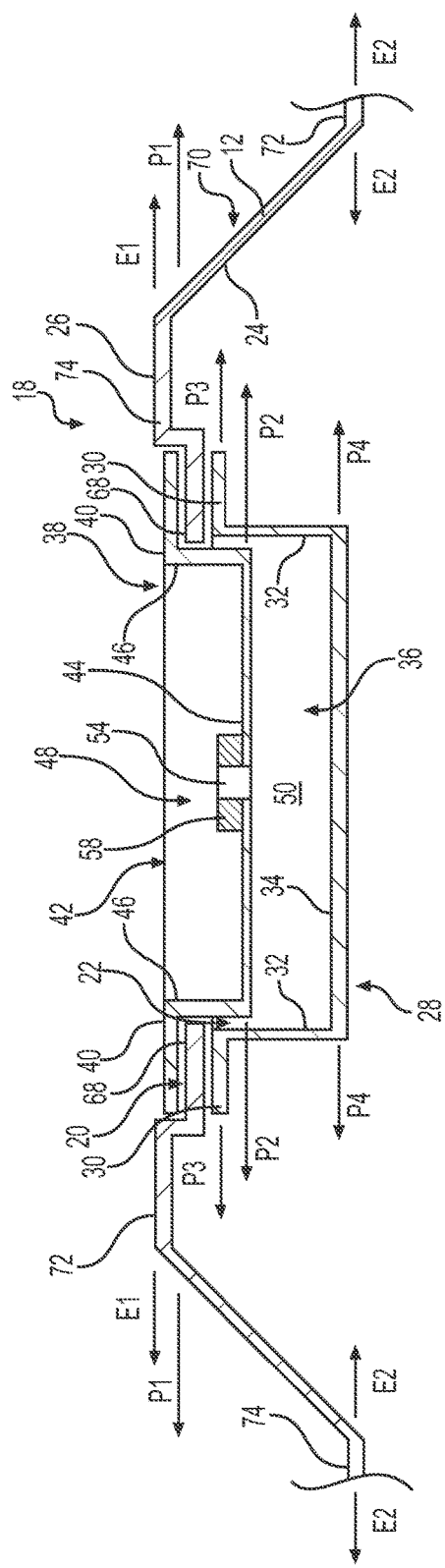
FIG. 7A is a schematic, side section view of an example junction box assembly shown in an example first orientation.
Figure 7B:
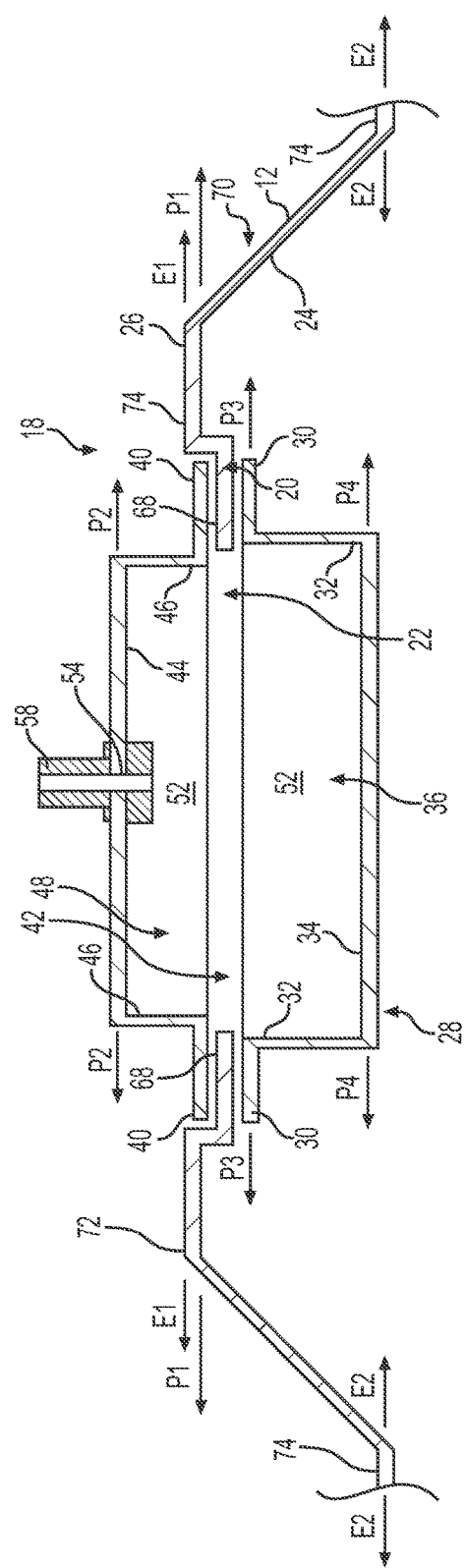
FIG. 7B is a schematic, side section view of an example junction box assembly shown in an example second orientation.

As shown in FIGS. 3 and 4, the example junction box assembly 18 also includes a junction box cover 38 configured to be coupled to the second panel face 26 of the backing panel 12 opposite the first panel face 24. As shown in FIGS. 7A and 7B, the example junction box cover 38 includes a mounting flange 40 defining a first plane P1 and a cover aperture 42. The example junction box cover 38 also includes a cover barrier 44 defining a second plane P2 spaced from the first plane P1, and a wall 46 extending between the mounting flange 40 and the cover barrier 44 and coupling the mounting flange 40 to the cover barrier 44, thereby defining a junction box cover recess 48. The example mounting flange 40, cover barrier 44, and wall 46 are formed as an integral single piece. In some examples, one or more of the mounting flange 40, cover barrier 44, and wall 46 may be formed as separate pieces and coupled to one another.

As shown in FIGS. 3, 4, 7A, and 7B, the example junction box cover 38 is reversible relative to the remainder of the junction box assembly 18. For example, the junction box cover 38 may be configured to be alternatively coupled to the backing panel 12, such that either (1) the cover barrier 44 of the junction box cover 38 is received in the junction box internal recess 36 and defines a first junction box space 50, or (2) the cover barrier 44 is spaced from the second panel face 26 and on a side of the backing panel 12 opposite the junction box base 28 and defines a second junction box space 52. In the example shown, the second junction box space 52 is larger (e.g., in volume) than the first junction box space 50.

In some examples, the backing panel 12, the junction box base 28, and the junction box cover 38 may be formed from the same material, such as, for example, plastic and/or metal (e.g., steel or aluminum). In some examples, one or more of the backing panel 12, the junction box base 28, and the junction box cover 38 may be formed from different materials, such as, for example, plastic and/or metal (e.g., steel or aluminum). For example, the backing panel may be formed from metal, and one or more of the junction box base 28 and the junction box cover 38 may be formed from plastic.

In some examples, as shown in FIGS. 7A and 7B, the first plane P1 defined by the mounting flange 40 and the second plane P2 defined by the cover barrier 44 are substantially parallel, for example, within manufacturing tolerances. In some examples, the wall 46 of the junction box cover 38 is sized and shaped to fit inside the peripheral flange 30 of the junction box base 28. In some examples, the wall 46 of the junction box cover 38 is shorter than the side wall 32 of the junction box base 28. In some examples, the cover barrier 44 of the junction box cover 38 includes a hole 54 configured to receive electrical conductors 56, for example, as shown in FIG. 3. In some examples, for example, as shown in FIGS. 4 and 7B, the junction box assembly 18 includes a tubular fitting 58 received in the hole 54 of the cover barrier 44 and extending away from the junction box cover recess 48.

In some examples, the mounting flange 40 defines mounting holes 60 for coupling the mounting flange 40 to the backing panel 12. In some examples, fasteners 62, such as, for example, screws, bolts, and/or rivets, may be used to couple the junction box cover 38 to the backing panel 12 via the mounting holes 60. In some examples, welding and/or adhesives may be used instead of (or in addition to) the fasteners 62. In some examples, the junction box cover 38 may be coupled to the backing panel 12 via a slot and anchor system or a slot and screw system. For example, opposing slots may be associated with the backing panel 12, and the mounting flange 40 of the junction box cover 38 may be received in the opposing slots, for example, via sliding. An anchor such as a flexible catch associated with the backing panel 12 may be configured to hold the mounting flange 40 in position in the opposing slots. In some examples, a fastener such as a screw may be used to hold the mounting flange 40 in position in the opposing slots.

In some examples, one or more collars (not shown) may be used to adjust the volume of the first and second junction box spaces 50 and 52. For example, a collar having a desired thickness may be sized and shaped to fit around the wall 46 of the junction box cover 38 and lie against the mounting flange 40. For example, when the junction box cover 38 is assembled to the junction box assembly 18 with the cover barrier 44 and the wall 46 nesting in the junction box base 28, the collar effectively prevents the cover barrier 44 and wall 46 from fitting as deeply into the junction box base 28, thereby effectively increasing the volume of the first junction box space 50 as compared to the volume of the first junction box space 50 without the use of the collar or collars. In some examples, one or more collars may be used to increase the volume of the second junction box space 52, for example, by placing the one or more collars against the portion 20 of the backing panel 12 surrounding the junction aperture 22 prior to mounting and coupling the junction box cover 38 to the junction box assembly 18.

As shown in FIGS. 7A and 7B, in some examples, the wall 46 of the junction box cover 38 is substantially perpendicular (e.g., within manufacturing tolerances) with respect to at least one of the first or second planes P1 or P2. In some examples, for example as shown in FIGS. 3 and 4, the cover barrier 44 of the junction box cover 38 defines at least one hole 64 at least partially closed by a frangible bridge 66 configured to break away from the cover barrier 44. The bridges 66 may be removed so that fittings and/or electrical conductors can pass through the holes 64.

As shown in FIGS. 7A and 7B, in some examples, the peripheral flange 30 of the junction box base 28 may define a third plane P3, and the base wall 34 of the junction box base 28 may define a fourth plane P4. In some examples, the fourth plane P4 may be substantially parallel to the third plane P3, for example, within manufacturing tolerances. In some examples, the first plane P1 of the mounting flange 40, the second plane P2 of the cover barrier 44, the third plane P3 of the peripheral flange 30, and the fourth plane P4 of the base wall 34 are substantially parallel to one another, for example, within manufacturing tolerances.

Referring to FIGS. 7A and 7B, in some examples, the junction aperture 22 of the backing panel 12 and the wall 46 of the junction box cover 38 are sized and shaped such that the wall 46 fits within the junction aperture 22. In addition, in some examples, the side wall 32 of the junction box base 28 is sized and shaped such that the wall 46 of the junction box cover 38 fits within the junction box internal recess 36. For example, as shown in FIG. 7A, the wall 46, the junction aperture 22, and the side wall 46 are sized and shaped, so that the junction box cover 38 fits through the junction aperture 22 and nests within the junction box base 28. In some examples, the second panel face 26 of the backing panel 12 defines a panel recess 68 surrounding the junction aperture 22, and the mounting flange 40 of the junction box cover 38 is configured to fit in the panel recess 68. In some examples, the backing panel 12 may include a guide structure configured to assist with proper positioning and alignment of the junction box cover 38 relative to the backing panel 12. In some examples, the panel recess 68 may serve this purpose. In some examples, the mounting flange 40 may include guide structures configured to assist with guiding the fasteners 62 into the holes 60. The guide structures may facilitate mounting and assembly of the junction box cover 38 to the junction box assembly 18 by feel rather than sight, for example, without the need for direct line-of-sight viewing.

As shown in, for example, FIGS. 3-7B, the example backing panel 12 includes embossments 70. In some examples, the embossments 70 may be configured to increase the rigidity of the backing panel 12. This may facilitate the use of a lighter weight and/or thinner material for the backing panel 12 without a significant loss of rigidity of the backing panel 12. In some examples, the embossments 70 may include raised portions 72 and recesses 74. In some examples, the raised portions 72 lie in a first embossment plane E1, and the recesses 74 lie in a second embossment plane E2. In the example shown, the first embossment plane E1 and the second embossment plane E2 are substantially parallel to one another, for example, within manufacturing tolerances. In some examples, for example as shown in FIG. 7A, when the cover barrier 44 of the junction box cover 38 is received in the junction box internal recess 36 and defines the first junction box space 50, the second plane P2 of the cover barrier 44 is between the first embossment plane E1 and the second embossment plane E2. In some examples, for example as shown in FIG. 7B, when the cover barrier 44 is spaced from the second panel face 26 and on the side of the backing panel 12 opposite the junction box base 28, and defines the second junction box space 52, the second plane P2 of the cover barrier 44 is on a side of the first embossment plane E1 opposite the second embossment plane E2.

Figure 5:
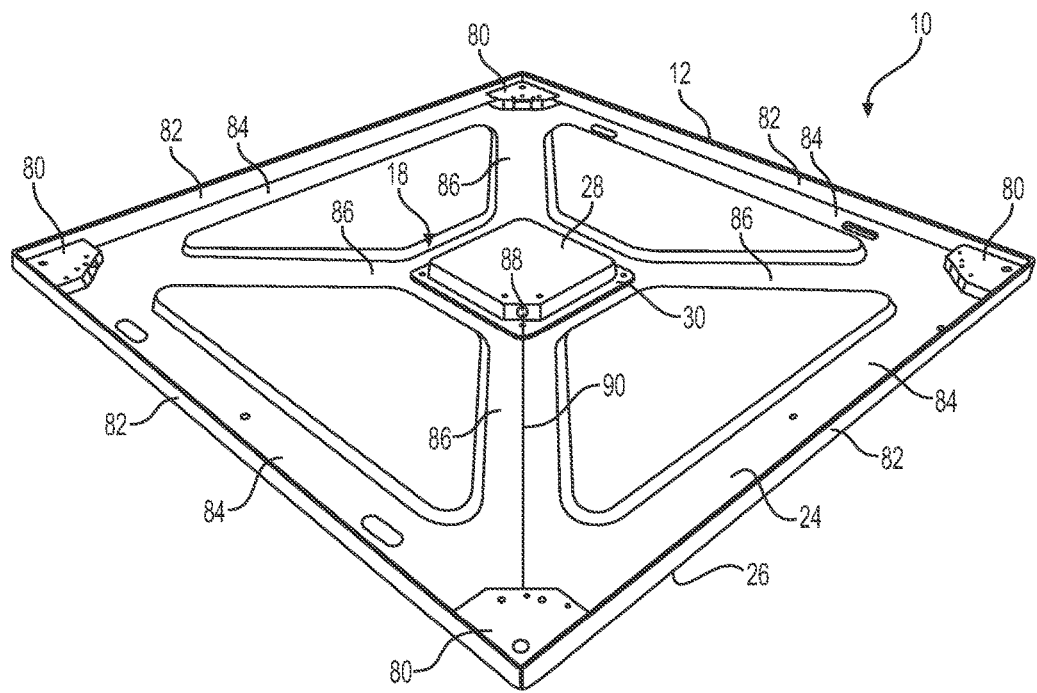
FIG. 5 is a schematic, perspective view of a portion of the example light emitting panel shown in FIG. 1.

As shown in FIG. 5, the example light emitting panel 10 includes corner reinforcement blocks 80 at each corner of the first panel face 24 of the backing panel 12. In the example shown, the backing panel 12 includes flanges 82 surrounding the backing panel 10 and extending away from the first panel face 24. The example corner reinforcement blocks 80 are coupled to the flanges 82, for example, via fasteners, welding, and/or adhesives. The corner reinforcements are configured to provide structural support for the backing panel 12 so that it maintains its shape and for other purposes described herein.

Figure 6:
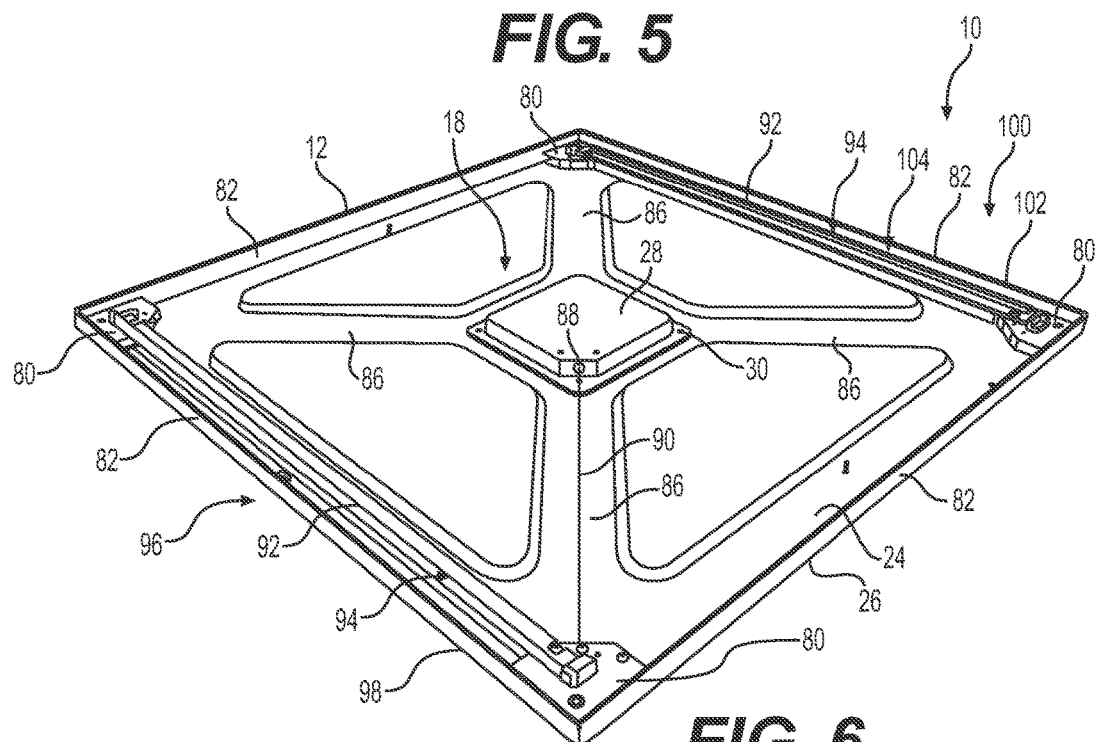
FIG. 6 is a schematic, perspective view of the example light emitting panel shown in FIG. 5 including example additional portions of the light emitting panel.

In the example backing panel 12 shown, the embossments 70 are shaped to define panel recesses 84 along each edge of the first panel face 24 of the backing panel 12. In addition, the example embossments 70 also define cross-recesses 86 extending between the junction box base 28 and the corner reinforcement blocks 80. As shown in FIGS. 5 and 6, for example, the junction box base 28 includes a power supply hole 88 aligned with one of the cross-recesses 86, the combination of which provides a conduit for routing electrical conductors 90 between the junction box base on the panel recesses 84, for example, via a corresponding one of the corner reinforcement blocks 80.

As shown in FIG. 6, in some examples, the light emitting panel 10 includes a plurality of light emitting diodes (LEDs) 92 configured to be energized and provide lighting. In some examples, the plurality of LEDs 92 may take the form of a strip 94 of LEDs 92, as shown in FIG. 6. For example, the strip 94 of LEDs may be a printed circuit board including a plurality of LEDs. In some examples, the light emitting panel 10 may include a first plurality of LEDs 96 along a first edge 98 of the backing panel 12 and a second plurality of LEDs 100 along a second edge 102 opposing the first edge 98 of the backing panel 12, for example, as shown in FIG. 6. For example, the first and second pluralities of LEDs 96 and 100 may take the form of the strip 94 of LEDs and a second strip 104 of LEDs. In some examples, the strips 94 and 104 may be rigid and may extend between adjacent corner reinforcement blocks 80, which may be configured to couple the strips 94 and 104 to the backing panel 12 to support the strips 94 and 104.

Figure 8:
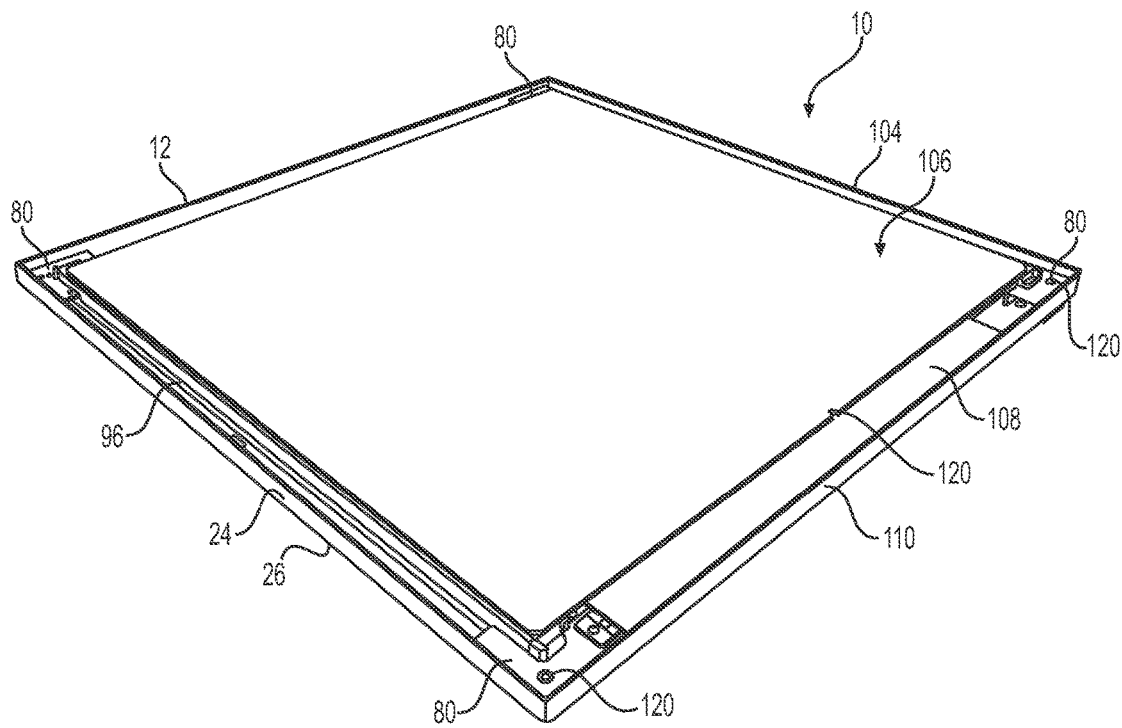
FIG. 8 is a schematic, perspective view of the example light emitting panel shown in FIG. 5 including example additional portions of the light emitting panel.

In some examples, the first plurality of LEDs 96 and the second plurality of LEDs 100 face one another, for example, as shown in FIG. 6. As shown in FIG. 8, the example light emitting panel 10 may include an illuminating panel 106 between the first and second pluralities of LEDs 96 and 100. The illuminating panel 106 is configured to direct the light emitted from the LEDs 96 and 100 so that it is emitted from the surface of the illuminating panel 106. The illuminating panel 106 may include one or more layers of optically transmissive sheets of material, such as, for example, acrylic sheets, polycarbonate sheets, and/or LEXAN® sheets of material.

As shown in FIG. 8, the example light emitting panel 10 also includes an electronics module 108 associated with the backing panel 12 and configured to provide electrical power to the pluralities of LEDs 96 and 100. In the example shown in FIG. 8, the electronics module 108 is associated with an edge 110 of the backing panel 12. For example, it is received in one of the panel recesses 84 along the edge 110 of the backing panel 12. In the example shown, the panel recess 84 receiving the example electronics module 108 is not one of the edges 98 or 102 that is associated with the LEDs 96 and 100. The electrical conductors 90 extending from the junction box base 28 via the power supply hole 88, the cross-recess 86, and the corresponding corner reinforcement block 80 may be coupled to the electronics module 108. In some examples, the electronics module 108 may include, LED drivers, power circuitry, and/or transformers configured to convert AC power supplied by the electrical conductors 90 via the junction box assembly 18 to electrical power suitable for use in activating the LEDs 96 and 100 upon activation of the light emitting panel 10.

Figure 9:
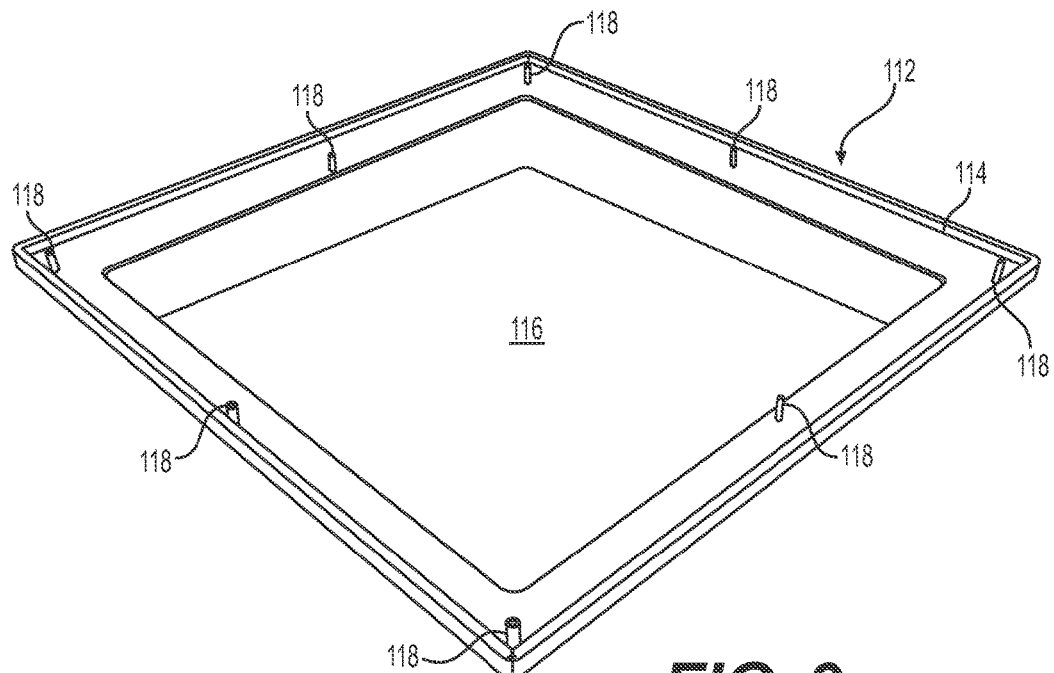
FIG. 9 is a schematic, perspective view of an example cover for an example light emitting panel.

In some embodiments, the light emitting panel 10 may include a cover 112 associated with the backing panel 12 and overlying the illuminating panel 106. For example, FIG. 9 shows an example cover 112 including a frame 114 surrounding a lens portion 116 that may include a translucent or transparent panel configured to permit light emitted by the illuminating panel 106 to pass therethrough and into the space being lit by the light emitting panel 10. The example cover 112 shown in FIG. 9 includes a plurality of receiver pins 118 on a reverse side of the frame 114 configured to receive fasteners (not shown) for coupling the cover 112 to the backing panel 12. For example, as shown FIG. 8, the backing panel 12 includes corresponding holes 120 (only three of which are shown) configured to receive fasteners (not shown) therethrough for coupling the cover 112 to the backing panel 12.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A junction box assembly for a light emitting panel, the junction box assembly comprising:
   a junction box base configured to be associated with a first panel face of a backing panel, such that a junction aperture in the backing panel is substantially closed by the junction box base, the junction box base comprising:
      a peripheral flange configured to be associated with the first panel face of the backing panel and surrounding the junction aperture at the first panel face;
      a side wall extending transverse to the peripheral flange; and
      a base wall associated with the side wall and configured to be spaced from and extend across the junction box aperture, thereby defining a junction box internal recess between the base wall and the junction box aperture; and
   a junction box cover configured to be coupled to a second panel face of the backing panel opposite the first panel face, the junction box cover comprising:
      a mounting flange defining a cover aperture;
      a cover barrier spaced from the mounting flange; and
      a wall extending between the mounting flange and the cover barrier and coupling the mounting flange to the cover barrier, and thereby defining a junction box cover recess,
   wherein the junction box cover is configured to be alternatively coupled to the backing panel to form a junction box, such that either (1) the cover barrier of the junction box cover is received in the junction box internal recess and defines a first junction box space, or (2) the cover barrier is spaced from the second panel face and on a side of the backing panel opposite the junction box base and defines a second junction box space, and wherein the second junction box space is larger than the first junction box space.

2. The junction box assembly of claim 1, wherein the mounting flange defines a first plane and the cover barrier defines a second plane spaced from the first plane, and wherein the first plane defined by the mounting flange and the second plane defined by the cover barrier are substantially parallel.

3. The junction box assembly of claim 1, wherein the wall of the junction box cover is sized and shaped to fit inside the peripheral flange of the junction box base.

4. The junction box assembly of claim 1, wherein the wall of the junction box cover is shorter than the side wall of the junction box base.

5. The junction box assembly of claim 1, wherein the cover barrier of the junction box cover includes a hole configured to receive electrical conductors, and the junction box assembly further comprises a tubular fitting received in the hole of the cover barrier and extending away from the junction box cover recess.

6. The junction box assembly of claim 1, wherein the mounting flange defines mounting holes for coupling the mounting flange to the backing panel.

7. The junction box assembly of claim 1, wherein the mounting flange defines a first plane and the cover barrier defines a second plane spaced from the first plane, and wherein the wall of the junction box cover is substantially perpendicular with respect to at least one of the first or second planes.

8. The junction box assembly of claim 1, wherein the cover barrier of the junction box cover defines at least one hole at least partially closed by a frangible bridge configured to break away from the cover barrier.

9. The junction box assembly of claim 1, the peripheral flange defines a third plane.

10. The junction box assembly of claim 9, wherein the base wall of the junction box base defines a fourth plane, and wherein the fourth plane is substantially parallel to the third plane.

11. The junction box assembly of claim 10, wherein the mounting flange defines a first plane and the cover barrier defines a second plane spaced from the first plane, and wherein the first, second, third, and fourth planes are substantially parallel to one another.

12. A junction box assembly for a light emitting panel, the junction box assembly comprising:
   a backing panel configured to be associated with a plurality of light emitting diodes, the backing panel defining a junction aperture, a first panel face, and a second panel face opposite the first panel face;
   a junction box base associated with the first panel face of the backing panel, such that the junction aperture in the backing panel is substantially closed by the junction box base, the junction box base comprising:
      a peripheral flange associated with the first panel face of the backing panel and surrounding the junction aperture at the first panel face;
      a side wall extending transverse to the first face of the backing panel; and
      a base wall associated with the side wall and configured to be spaced from and extend across the junction aperture, thereby defining a junction box internal recess between the base wall and the junction aperture; and
   a junction box cover configured to be coupled to the second panel face of the backing panel opposite the first panel face, the junction box cover comprising:
      a mounting flange defining a cover aperture;
      a cover barrier spaced from the mounting flange; and
      a wall extending between the mounting flange and the cover barrier and coupling the mounting flange to the cover barrier, and thereby defining a junction box cover recess,
   wherein the junction box cover is configured to be alternatively coupled to the backing panel such that either (1) the cover barrier of the junction box cover is received in the junction box internal recess and defines a first junction box space, or (2) the cover barrier is spaced from the second panel face and on a side of the backing panel opposite the junction box base and defines a second junction box space, and wherein the second junction box space is larger than the first junction box space.

13. The junction box assembly of claim 12, wherein the junction aperture of the backing panel and the wall of the mounting flange are sized and shaped such that the wall fits within the junction aperture.

14. The junction box assembly of claim 12, wherein the second panel face of the backing panel defines a panel recess surrounding the junction aperture, wherein the mounting flange of the junction box cover is configured to fit in the panel recess.

15. The junction box assembly of claim 12, wherein the backing panel comprises embossments, and wherein the embossments comprise raised portions and recesses, and wherein the raised portions lie in a first embossment plane and the recesses lie in a second embossment plane.

16. The junction box assembly of claim 15, wherein the first embossment plane and the second embossment plane are substantially parallel to one another.

17. The junction box assembly of claim 16, wherein the mounting flange defines a first plane and the cover barrier defines a second plane spaced from the first plane, and wherein when the cover barrier of the junction box cover is received in the junction box internal recess and defines the first junction box space, the second plane of the cover barrier is between the first embossment plane and the second embossment plane.

18. The junction box assembly of claim 16, wherein when the cover barrier is spaced from the second panel face and on the side of the backing panel opposite the junction box base, and defines a second junction box space, the second plane of the cover barrier is on a side of the first embossment plane opposite the second embossment plane.

19. A light emitting panel comprising:
    a backing panel for the light emitting panel configured to be associated with a plurality of light emitting diodes, the backing panel defining a junction aperture, a first panel face, and a second panel face opposite the first panel face;
    a plurality of light emitting devices associated with the first panel face of the backing panel and facing across the backing panel;
    at least one illuminating sheet adjacent the plurality of light emitting diodes and extending at least partially across the backing panel;
    a junction box base associated with the first panel face of the backing panel, such that the junction aperture in the backing panel is substantially closed by the junction box base, the junction box base comprising:
        a peripheral flange associated with the first panel face of the backing panel and surrounding the junction aperture at the first panel face;
        a side wall extending transverse to the first face of the backing panel; and
        a base wall associated with the side wall and configured to be spaced from and extend across the junction aperture, thereby defining a junction box internal recess between the base wall and the junction aperture; and
    a junction box cover configured to be coupled to the second panel face of the backing panel opposite the first panel face, the junction box cover comprising:
        a mounting flange defining a cover aperture;
        a cover barrier spaced from the mounting flange; and
        a wall extending between the mounting flange and the cover barrier and coupling the mounting flange to the cover barrier, and thereby defining a junction box cover recess,
    wherein the junction box cover is configured to be alternatively coupled to the backing panel such that either (1) the cover barrier of the junction box cover is received in the junction box internal recess and defines a first junction box space, or (2) the cover barrier is spaced from the second panel face and on a side of the backing panel opposite the junction box base and defines a second junction box space, and wherein the second junction box space is larger than the first junction box space.

20. The light emitting panel pf claim 19, wherein the plurality of light emitting devices comprises a first plurality of light emitting diodes along a first edge of the backing panel and a second plurality of light emitting diodes along a second edge of the backing panel, and wherein the first plurality of light emitting diodes and the second plurality of light emitting diodes face one another, and the illuminating panel is between the first and second pluralities of light emitting diodes.

21. The light emitting panel of claim 19, further comprising an electronics module associated with the backing panel and configured to provide electrical power to the plurality of light emitting devices, wherein the electronics module is associated with an edge of the backing panel, and the light emitting panel further comprises an electrical conductor providing electrical power to the electronics module via the junction box assembly.

* * * * *